June 8, 1965     J. I. MARTIN ARTAJO     3,187,507

THERMODYNAMIC MACHINE

Filed April 2, 1962     9 Sheets-Sheet 5

INVENTOR.
JOSE IGNACIO MARTIN ARTAJO
BY
ATTORNEYS

June 8, 1965    J. I. MARTIN ARTAJO    3,187,507
THERMODYNAMIC MACHINE
Filed April 2, 1962    9 Sheets-Sheet 6

Fig. 13

INVENTOR.
JOSE IGNACIO MARTIN ARTAJO
BY
ATTORNEYS

United States Patent Office 3,187,507
Patented June 8, 1965

3,187,507
THERMODYNAMIC MACHINE
Jose Ignacio Martin Artajo, 23 Alberto Aguilera,
Madrid, Spain
Filed Apr. 2, 1962, Ser. No. 184,009
Claims priority, application Spain, Nov. 20, 1961, 272,170
14 Claims. (Cl. 60—39.38)

In positive-displacement thermodynamic machines or heat engines, in contrast to those of the centrifugal force type and turbines, there is utilised a series of cavities of varying volume to which the operating fluid is admitted and in which it is compressed, energised, expanded and then expelled. By means of a suitable mechanical arrangement the resultant thermodynamic energy of the engine cycle is transmitted to a shaft (or is received from a shaft) in the form of a driving torque and rotation.

A thermodynamic machine in accordance with the invention has the following advantages as compared with conventional machines.

The machine is characterised by a non-deformable rotor which is balanced, centred and rigidly connected to the shaft of the machine. The rotor is very easy to machine in a peripheral curve which permits adaptation to chambers of greater or smaller volume. The machine radial pressures are symmetrically balanced and, therefore, have a zero resultant against the main shaft bearings.

A number of heads of the machine oscillate slightly but are guided by rotary action and connected to the inner face of a fixed casing of the machine by means of teeth cut in the casing and in the outer part of each head.

The heads contain in their concave portion the energisation or combustion chambers, which are of optimum volume and shape for achieving any volumetric compression whatsoever which permits the best energisation by combustion (stratified, anti-knock, etc.) of any fuel (petrol, gas oil, etc.), or by "clean" thermodynamic reaction.

The seals are friction seals, with adaptation to the rotor by resilient loading independently of the centrifugal force on the rotor itself, with free thermal expansion and automatically compensated wear providing longer life.

The engine, although adapted to the Otto cycle, operates more particularly by injection (petrol, gas oil, mixtures) on a two-stroke or four-stroke cycle, or by clean synchronised instantaneous thermodynamic reaction.

The machine forming the subject-matter of this application preferably operates as an engine with eight energisation or combustion phases per revolution (four-stroke cycle) or with nine energisation or combustion phases (two-stroke cycle), but can be adapted if desired to a lesser or greater number of combustion phases per revolution.

The pressures on the rotor resulting from compression, explosion, etc. are symmetrical with respect to the rotor axis and to the casing and have a zero radial component against the bearings of the machine, as has already been stated, and this considerably reduces bearing wear.

The scavenging air and combustion air is introduced under pressure by the rotor, which thus takes the place of a supercharger and provides scavenging air and cooling air for the rotor much more efficiently than in conventional systems.

The rotor, in turn, contains exhaust ducts which are machined in such manner that they form a reaction turbine, also known as a back-pressure turbine, which utilises a large part of the energy contained in the exhaust gases when they leave the operating chambers after expansion.

A machine in accordance with the invention can also operate as a pump and compressor by suitable arrangement of the ports in the rotor and provision of a check valve controlling the exhaust ports.

A machine in accordance with the invention also forms an excellent "jet generator" for jet propulsion units by arranging the exhaust port so that the energised gas issues axially at the appropriate pressure. In this way, the three functions of compression, combustion (energisation) chamber and turbine (for driving the compressor) are obtained in a single machine under conditions much better than those appertaining in present jet engines, as it utilises a thermal cycle with a greater temperature drop and consequently with greater efficiency.

The invention will now be further described with reference to the accompanying diagrammatic drawings which are given by way of example, and in which.

The machine comprises a fixed casing 1 supporting in its interior oscillating caps or heads 2 of special shape and, inwardly of the heads 2, a rotor 3 which rotates with a shaft 4 on which it is fixed bearings fixed to the casing.

(A) Cavities of varying volume in which the pressures and energisation of the thermodynamic fluid are produced are formed between concavities of the heads 2—which include the combustion chambers proper and take the place of the cylinders and cylinder heads of conventional engines—and convexities of the rotor 3. The rotor contains inlet ducts 5 for combustion air, inlet ducts 6 for the fuel (preferably by injection) and outlet or exhaust ducts 7 for the gases resulting from combustion.

The casing is machined internally with a number of cylindrical surfaces 8 with a section normal to the main axis of the machine. This section is of simple form and such that the oscillating heads 2 bear thereon by outwardly directed pressure and oscillate in a suitable manner by rolling without sliding against the surfaces 8.

The tangential stress, opposed to that caused in the rotor by the thermodynamic pressures (principle of action and reaction) is supported by teeth 9 and 10 cut in such manner that the middle curves 11 and 12, or the curves of rolling contact, of the teeth (equivalent to the pitch circles) are the same as the curves defining the cylindrical guide surfaces and surfaces of contact between the casing 1 and its associated surfaces on the oscillating heads 2.

(B) The two curves or profiles, evolvent in the casing 1 and involute in the outer part of the heads 2 must be conjugated with one another so that, when the sealing contacts of the heads 2, which are a constant distance from one another, slide on the periphery of the rotor 3 they provide a rolling guide for the heads without any sliding action and such that the eccentricity of the rotor 3, the resultant capacity of the expansion chambers, the dynamic stability, the oscillation or rocking of the heads 2, the magnitude of the lever arm of the pressures, the regularity of the couple or moment of forces on the shaft 4, the facility with which said profiles and the teeth thereon can be cut and, lastly, the lubrication and cooling of the system provide optimum conditions for the operation of the engine.

A very good and easy approximation to this optimum is that determined, not exclusively, by the following two profiles: profile in the casing 1, a circle with its centre between the engine axis and infinity (straight guide) approximately of a radius of one to four times the length of the radius $r_0$ of the basic circle of the casing. The conjugate profile of the heads 2 will be the resultant as an involute curve by rolling.

In this way, the result is obtained that the pressures produced inside the cavities of varying volume formed between the convexities 13 of the rotor 3 and the concavities 14 of the oscillating heads 2 support the latter and enable them to oscillate guided by the combination of the supporting and rolling surfaces 8 (conjugate curves) and the teeth 9 cut specially along the length, i.e. axially, of said heads, with the minimum friction and wear.

The number of heads 2 corresponds to the number of greater convexities of the rotor 3 and such number may be two, three, four, etc. For practical reasons, the machine preferably has three oscillating heads for two-stroke engines with $3 \times 3 = 9$ energisation or combustion operations per revolution of the shaft 4 and has four heads for $2 \times 4 = 8$ energisation or combustion operations per revolution for four-stroke cycles.

In the heads 2 there are friction seals pressed by resilient springs against the rotor 3 and disposed in such manner that their expansion is free and wear is automatically compensated.

Figure 11:
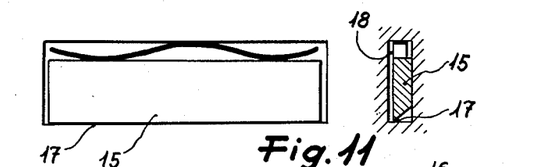
FIGURE 11 shows in elevation and in cross-section a radial seal and indicates the manner in which it is fitted.

The seals are of two types: radial seals 15 and lateral seals 16. The radial seals are prisms of hard metal which have fitting edges 17 which engage the rotor 3 on a straight line parallel to the rotational axis thereof, and they slide in grooves 18 formed in the heads 2 so that the fluid under pressure, entering the grooves, assists the sealing pressure. In order to obtain a better seal, two such sealing prisms meeting on the same line of contact can be fitted.

Figure 12:
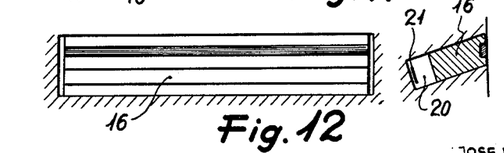
FIGURE 12 shows an elevation and a cross-section of a lateral seal.

The lateral seals 16 are constituted by hard prisms 19 with (or without) grooves (grease seal) in that face which fits against the lateral wall of the rotor 3. They are housed in a groove 20 cut in the sides of the oscillating heads and are pressed against the rotor by springs 21. The grooves in which the lateral seals are housed are inclined in such manner that the wear caused by friction assists in a continuous adjustment or adaptation to the rotor 3, particularly at the angle or corner where it meets the radial seal.

Figure 4:
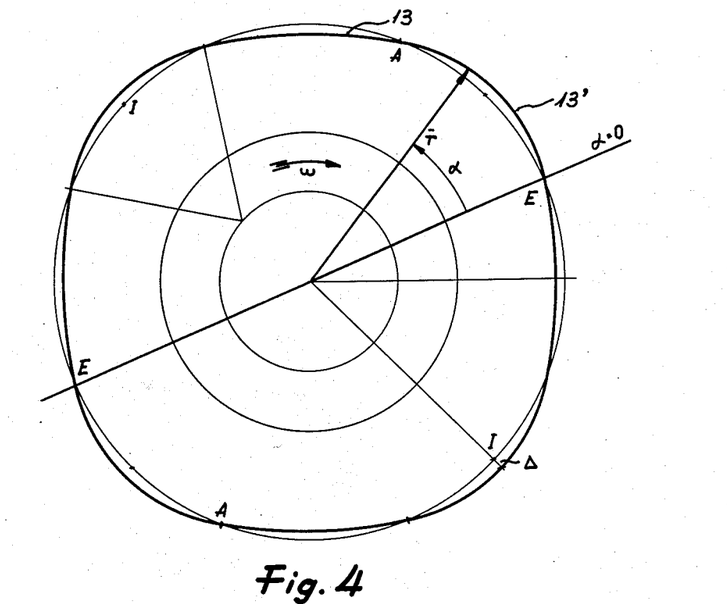
FIGURE 4 is a detail diagrammatic view showing the configuration of the last-mentioned rotor.

The rotor is a solid and non-deformable part 3 which is therefore able to rotate at high speed and can be constructed, without excluding other possibilities, in one of two forms. It may be in the general form of a cylinder with a cross-section in the form of a curvilinear triangle (FIGURE 2) or in the form of a curvilinear quadrilateral (FIGURE 4).

Figure 1:
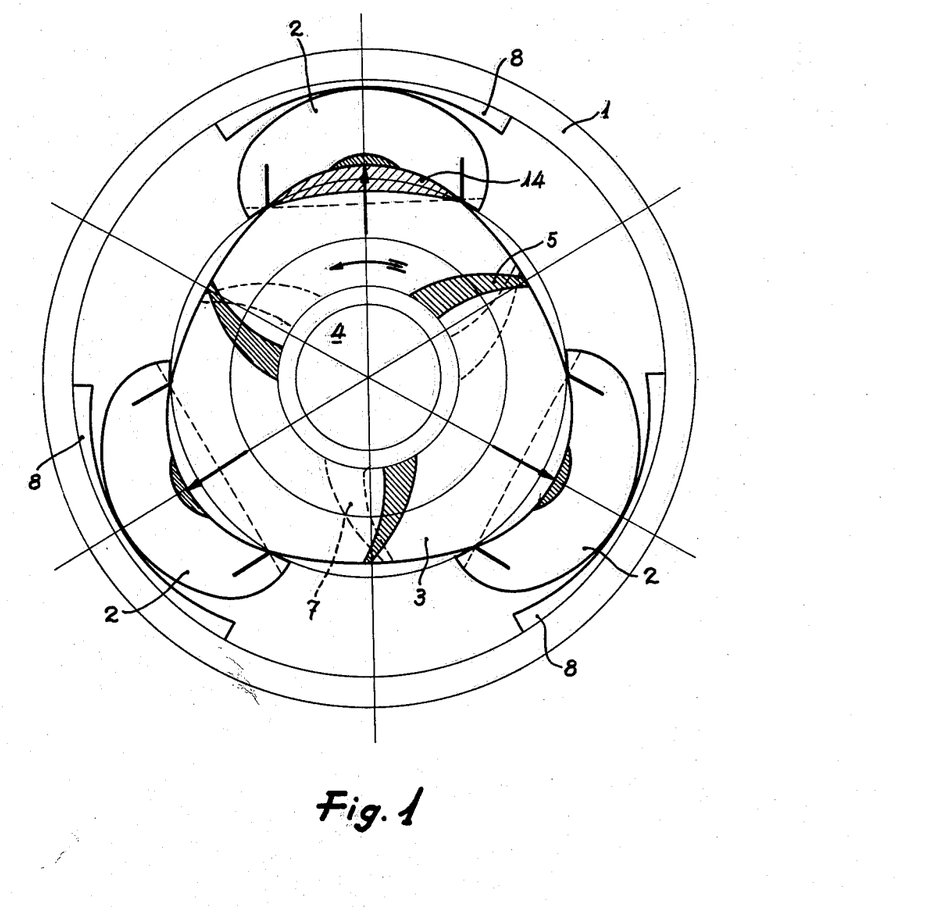
FIGURE 1 is a diagrammatic front view of an engine designed in accordance with the invention with a rotor in the form of a curvilinear triangle.
Figures 2, 7, 8:
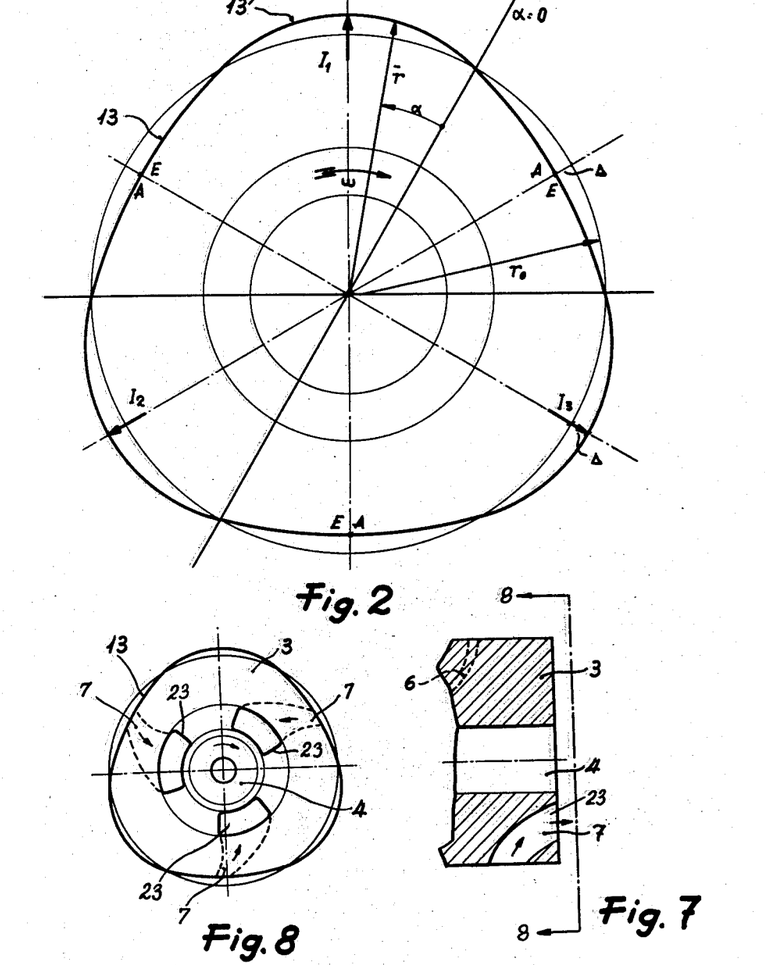
FIGURE 2 is a detail diagrammatic view showing the construction of the rotor shown in FIGURE 1.
FIGURE 7 is a sectional view similar to that of FIGURE 5, this time showing the ducts of the rotor through which the exit of the exhaust gases is effected.
FIGURE 8 is a front view of the last-mentioned face taken from line 8—8 in the direction of the arrows shown in FIGURE 7.
Figure 3:
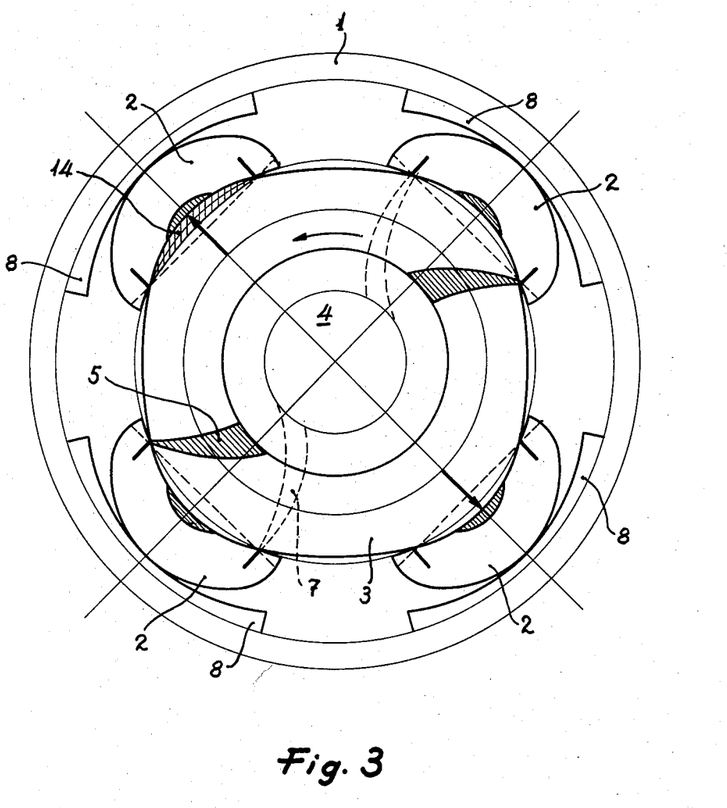
FIGURE 3 is a front view similar to that of FIGURE 1, showing a rotor in the form of a curvilinear quadrilateral.

The rotor in the form of a curvilinear triangle as in FIGURE 2 has three convexities which conform exactly to the convexities of the three corresponding rocking heads 2, so that the air admitted is compressed in the corresponding combustion chamber. Approximately at the outermost point there is a fuel injector 22 supplied by an injection pump fixed to the rotor. The injectors introduce the atomised fuel (and, if required, the mixture) into the combustion chamber already filled with air under high pressure and at elevated temperature. At this instant, the combustion or energisation of the compressed fluid occurs by heat of compression or alternatively as described in the next paragraph.

In order to achieve maximum reliability of combustion, even in the event of the engine operating at high altitudes with respect to sea level or with poor fuels, the combustion chamber accommodates a filament which becomes incandescent due to a discharge or "flash" produced by a conventional electrical system of controlled diodes and transistors synchronised with the rotor shaft.

The expansion then follows until optimum utilisation of thermodynamic cycle is obtained between the concavity of the rocking head 2 and the convexity of decreasing curvature of the rotor 3.

The characteristic curve of the peripheral section of the rotor has a periodicity of rate three, and therefore, can be expressed in an approximate and non-exclusive manner by the (periodic) function as a function of the angle $\alpha$ by the following formula in development of Fourier's series:

$$\bar{r} = f(\alpha) = \Sigma \bar{r}_0 (1 + k \sin 3\nu\alpha)$$

$$K = \frac{\Delta}{r_0}$$

in which $\Delta$ is the maximum eccentricity of the convexities of the rotor with respect to the basic circle of radius $r_0$.

The curve thus defined is obtained with great approximation and in an easy manner as a combination of circular arcs, some 13 with a large radius of curvature and others 13' with a much smaller radius of curvature, the latter arcs being determined by the elemental condition of being tangential to the first-mentioned arcs at the points of zero eccentricity. The larger the difference between the radii of curvature of these two kinds of circle, the larger will be the eccentricity $\Delta$ and the larger will also be the volume of the resultant expansion chamber: the limit of optimum suitability is determined by the greatest permissible amplitude of the oscillation of the oscillating heads 2 in relation to the rotor 3 and in relation to the toothed guides of the casing 1.

The rotor 3 has exhaust ports 23, FIGS. 7 and 8, approximately in the parts of least convexity or arranged so that the combustionu gases, already expanded, issue at an angle in the direction of the axis in the wall-ends of the said rotor, producing in the suitably formed ducts 7 of the rotor 3 a reaction which makes the greatest use of the thermodynamic energy (in a manner equivalent to the runner of a reaction turbine).

Figures 5, 6:
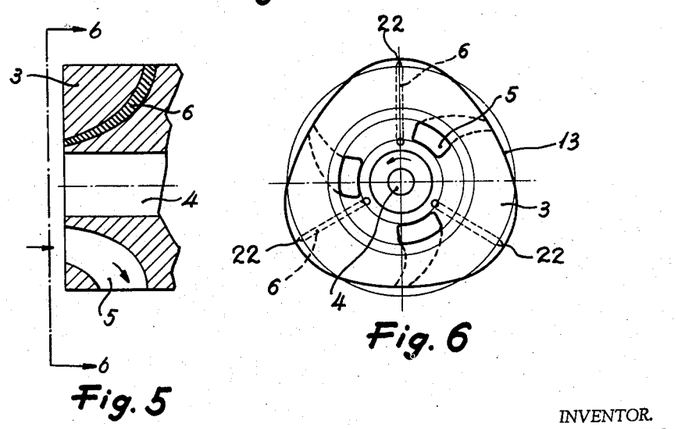
FIGURE 5 is a partial detail sectional view in an axial plane of the rotor showing the air intake ducts.
FIGURE 6 is a front view from line 6—6 in the direction of the arrows shown in FIGURE 5.
Figure 9:
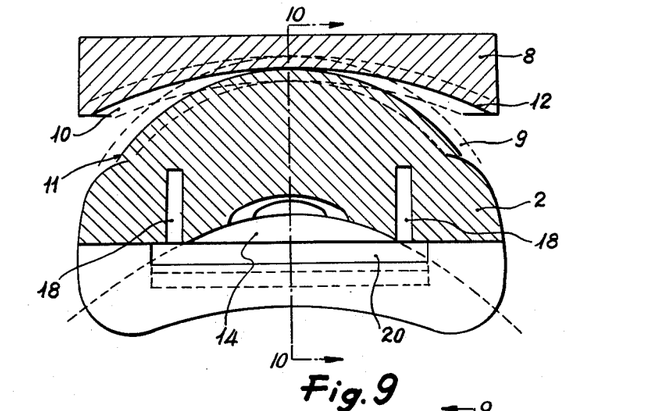
FIGURE 9 is a section taken through an oscillating head on the line 9—9 in FIGURE 10.
Figure 10:
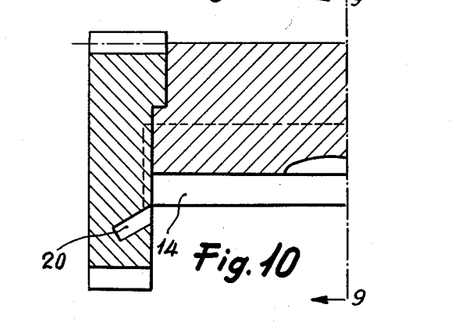
FIGURE 10 shows one half of the section on the line 10—10 in FIGURE 9.

The entry of the main combustion air takes place fundamentally in the direction of the axis through the rotor at the two side ends, in such manner that the air is compressed in ducts 5 suitably formed in the interior of the rotor 3 (as between the vanes of a centrifugal compressor) and introduced under pressure into the main chambers to effect the scavenging and cooling thereof and finally to be compressed in the combustion chamber. In this way, charging is effected with a greater weight of air, greater temperature, greater specific power and a scavenging which is very effective and at the same time cooling and which lasts for one half of a cycle (T): T/4 expansion; 2T/4 scavenging and cooling; T/4 compression.

What has been said of the rotor in its construction in the form of a curvilinear triangle can be applied to the construction in the form of a curvilinear square, as will be seen in FIGURE 4. It is only necessary to note that in this case the expansion chambers are smaller for a rotor of equal basic radius $r_0$; the thermodynamic cycle comprises four separate strokes corresponding to two diametrically opposite simultaneous injections when the injectors of the rotor pass over each of the heads and combustion chambers. Therefore, the number of combustion or energisation operations per revolution is $2 \times 4 = 8$. The characteristic curve of the rotor is given fundamentally by the equation $r = \Sigma r_0 (1 + k \sin 4\nu\alpha)$ with $$k = \frac{\Delta}{r_0}$$

as parameter of eccentricity as a function of which the maximum expansion chamber is determined. An approximate cutting or generation in circular arcs is also effected, as will be seen from FIGURE 4.

In cases of greater speed and higher specific pressure, guides for the rocking heads are provided on one or both of the frontal portions of the rotor: on these guides there rest with a rolling action rollers having spindles in the lateral parts of the heads. The rollers in their corresponding bearings permit accurate guiding which eases the work of guiding the oscillating heads in the casing and the pressure of the radial seals on the rotor.

The cycle of this thermodynamic machine operating as an engine is as follows: (1) a compression by centrifugal force in the ducts of the rotor (vanes) which could amount to 1.75 atms., and with a temperature resulting from the compression in the already hot rotor; (2) a compression in the cavities of the machine until the volume of the combustion chambers in the oscillating heads or caps is reduced, with a consequent rise in temperature; (3) combustion (petrol, gas oil, etc.) assisted by the ignition (spark in the corresponding sparking plug, or by synchronous incandescence of a filament); (4) expansion in the cavities formed between the rotor and the oscillating heads until the final volume of the same is reached (volumetric ratio of 8, 12 or more to 1, according to the fuel injected); (5) escape of the gases through the exhaust ducts of the rotor at a back pressure which could reach 1.60 atmospheres and expansion in said exhaust ducts to about atmospheric pressure, with the consequent transfer of energy to the rotor as in a reaction turbine.

The cooling of a machine in accordance with the invention can be effected by means of water or air; the oscillating heads and the rotor are readily accessible to both types of cooling. The pressure and temperature of the cycle corresponding to the fuel chosen will give preference to one system or the other. Be it noted, however, that in the two-stroke cycle the air admitted is scavenging and cooling the chambers formed between the rotor and the oscillating heads for almost one half of the duration of the thermodynamic cycle and that, in the machine having a curvilinear triangular rotor, just as in that having a curvilinear quadrangular rotor, the air admitted cools the rotor internally and all the interior space between the casing and the rotor very effectively.

Lubrication of this machine is ideal, since it can be effected in closed circuit, because the casing is closed and can collect the oil in the lower part by means of a pump and deliver it afresh to lubricate the heads, bearings, etc.

It will be apparent from the above description that the motor of the present invention presents a rotor and a stator. The oscillating heads 2 are applied closely to the periphery of the rotor by means of suitable hermetically sealing elements. Such heads oscillate in the stator with a rolling movement. The turning of the rotor with respect to the heads produces variations in the volumes of the chambers enclosed between the rotor and each one of such heads. Each one of the heads presents, on the exterior, a series of teeth which, meshed with another fixed series of teeth on the stator, pieces 8, and makes possible the rolling movement of the heads thereby permitting a perfect adjustment of the said heads on the rotor. These zones of adjustment are those which are provided with the special hermetically sealed gaskets.

Consequently, as a result of the turning of the rotor, diminutions and increases in the volume of the chambers 14 which are formed between the heads and the rotor are produced. Some conduits in the rotor from one end face towards the periphery, lead into the areas of the said periphery which are appropriate in relation with the relative positions of the heads so that some of the conduits referred to may serve for the exhaust, and others for the intake. The intake conduits have been shown as 5 and the exhaust conduits as 7; 23 represents the exhaust ports in which the conduits 7 begin.

Thus on the periphery of the rotor there exist intake ports, exhaust ports, and injectors 22, which receive the fuel under pressure by 6 radially.

The intake ports are arranged on the rotor in such a fashion that they remain in the interior of the chambers 14 formed between the rotor and the oscillating heads while the volume of such chambers is increasing. This increase alone can produce the suction necessary for the filling of the chambers, as happens in conventional piston motors which are not supercharged.

At the moment in which, because of the continuing of the turning movement of the rotor, the diminution of volume of the chambers commences, the intake ports emerge from the region of the chamber, which remains cut off until it attains its minimum volume, at which moment the injection of fuel is produced by means of 6, 22. On the rotation of the rotor continuing, there penetrates into the chambers the appropriate exhaust ports 23, but not before the expansion of the combustion gases has contributed to the movement of the rotor.

The relative arrangement of ports is a question analogous to that of the instance of opening and closing of the valves in 4-stroke piston motors, or to that of the arrangement of the ports in 2-stroke motors. The moment of the injection is a question analogous to that of injection in a conventional diesel, with its advances, retards, etc. The necessary fuel pump is incorporated in the rotor itself.

The expansion of gases following upon their combustion is effected within the chamber 14, which gradually increases in size as a consequence of the turning of the rotor. This expansion drives the rotor, for the reason which will now be seen; the utilization of the gases in order to act upon a part conceived as a turbine in the rotor itself is not, then, essential for the functioning of the machine, and it only contributes to improving the performance of the said machine, and that for the following reason: The more the opening of the exhaust ports is retarded (introduction of the ports 23 in the interior of the chambers 1, 4) the greater will be the impulse transmitted to the rotor by the gases in expansion, but the less will be the time available for the exhaust. Therefore, if it is managed to anticipate the opening of the exhaust ports 23 without the gases escaping as a complete loss, then the performance of the motor will have been improved. But in the motor of the present invention this objective is easily attainable by making the outlets 7 with a helicoidal form to achieve a turbine effect, an effect which is, of course, secondary (although important) with relation to the fundamental characteristics of the motor.

In the same way, although the suction is produced in the manner already indicated, a suitable arrangement of the intake conduits can contribute to an effect of supercharging, which is extremely useful.

In each chamber there will be, because of the revolution of the rotor, as many increases and decreases of volume as there are "sides" presented by the rotor; thus, three for a triangular rotor, etc. If in each chamber combustion is produced each time that the maximum degree of compression is achieved, the functioning will be in accordance with two-stroke cycles. On the contrary, if between each two combustions a compression without combustion is produced, the motor will function in cycles of four strokes. This depends upon how the injection of fuel has been arranged. The four-stroke functioning has in this case the object of assuring, in the intermediate time, a perfect emptying of the chambers 14.

The oscillating caps or heads have been shown so far in a centred or symmetrical arangement, whereby excellent working conditions are obtained for the engine. If, however, the same heads are arranged in a slightly inclined position, the dead centre is better overcome, since in this position the resultant of pressure of each chamber is then deflected with respect to the axis of rotation, thus presenting a non-zero moment.

Figure 13:
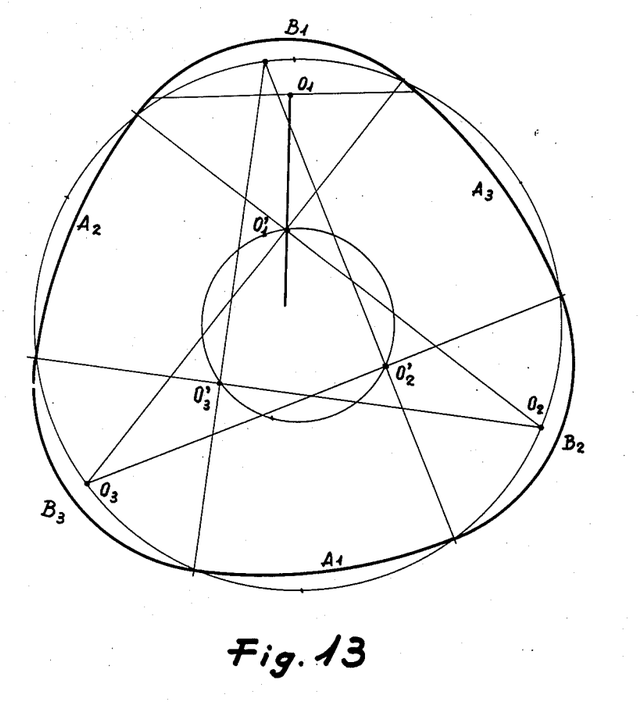
FIGURE 13 is a diagrammatic front view of a rotor in the form of a curvilinear triangle symmetrically deformed in order to obtain a non-zero couple at the moment of maximum combustion pressure, FIGURES 14 and 15 respectively show a front view and a cross-section of a four-stroke motor in which the rotor has two circular sides that enclose the oscillating heads and symmetrically arranged intake ducts 5', and exhaust ducts 7'.

A rotor profile suitable for this last arrangement is constructed by causing the arcs of different curvature in its outline to intersect alternately inside and outside the pitch circle, as shown in FIGURE 13.

Figure 14:
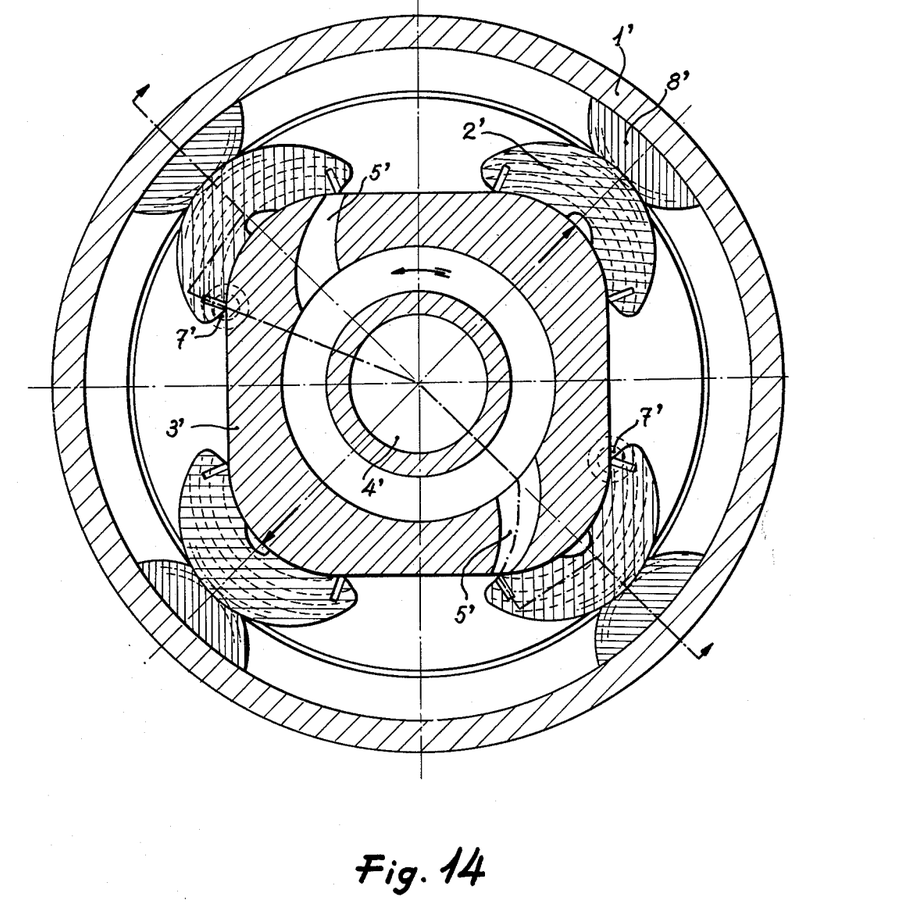
Figure 15:
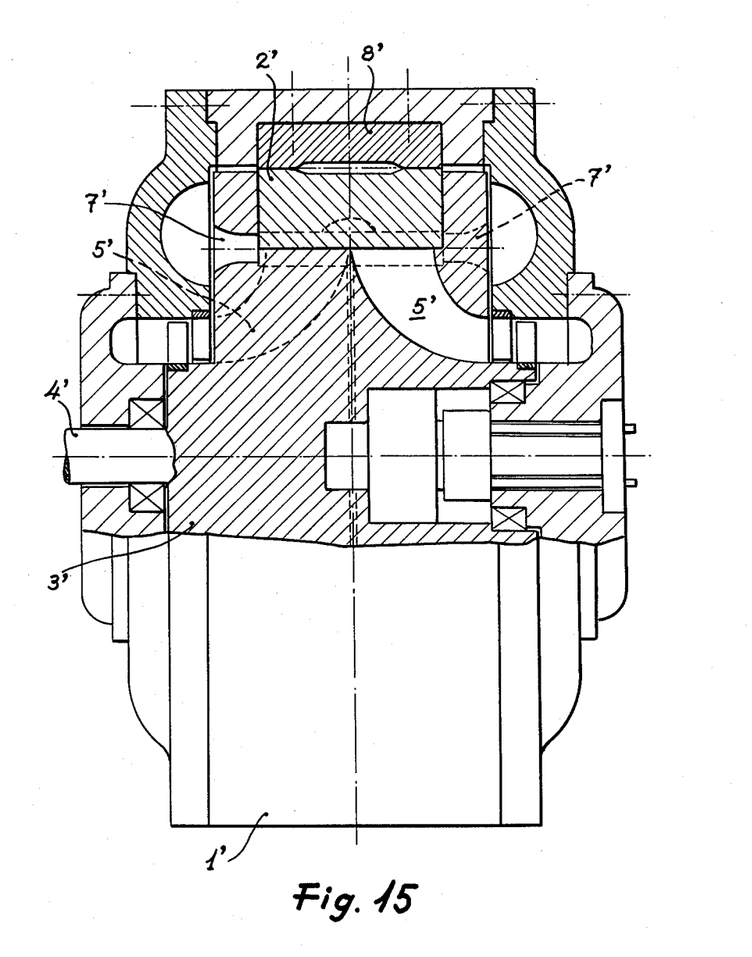
Figure 16:
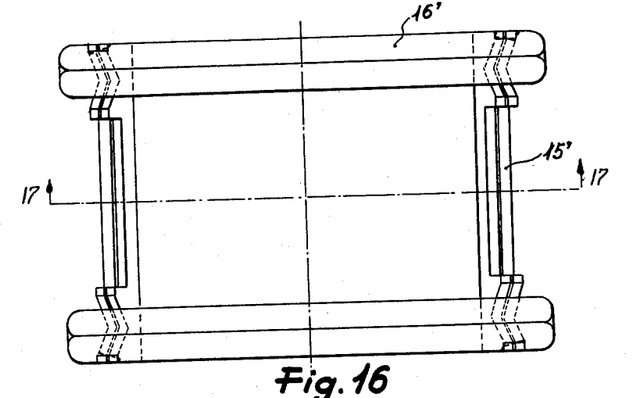
FIGURE 16 is a bottom detail view of the radial and lateral seals utilized in FIG. 14.
Figure 17:
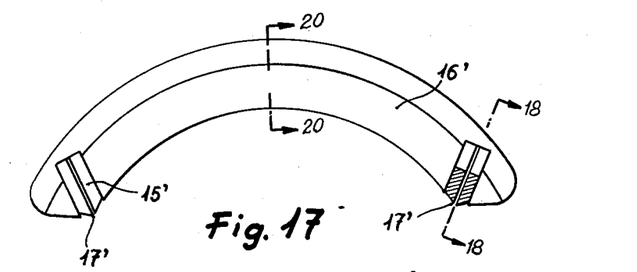
FIGURE 17 is a sectional view taken from line 17—17 of FIG. 16.
Figure 18:
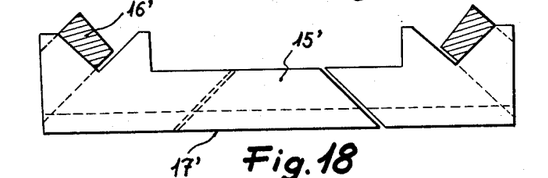
FIGURE 18 is a sectional view taken from line 18—18 of FIG. 17.
Figure 19:
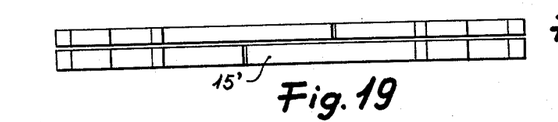
FIGURE 19 is a bottom view of the seals shown in FIG. 18.
Figure 20:
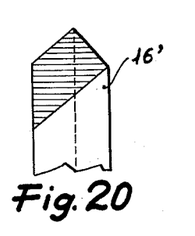
FIGURE 20 is a partial section taken on line 20—20 of FIG. 17.

FIGS. 14 and 15 show a view and a cross-section of the four-stroke motor in which the rotor has two circular sides that enclose the oscillating heads and symmetrically arranged intake ducts 5', and exhaust ducts 7'. Thereafter the oscillating heads have smaller inertia forces.

The radial sealing strips 15' cause a double labyrinth type sealing; edges 17' in connection with lateral seals 16', as it is represented in FIGS. 16 to 20. Radial and lateral seals are housed in grooves 18 respect. 20 cut in the oscillating heads 2' and pressed by springs 21 against the rotor in order to provoque a pressure-assisted autoclave effect.

I claim:

1. A thermodynamic machine comprising a stator constituting an outer casing of the machine, said stator being formed with symmetrical contours and mutually parallel plane sides, a fundamentally cylindrical rotor rotatably mounted about the machine axis, said rotor having a non-circular cross-section defined at its periphery by a curvilinear polygon of multiple symmetry with respect to said axis, an annular clearance space being provided between the inner face of the stator and the outer face of the rotor, and at least two oscillating heads which rock without sliding and do not rotate with the rotor and are symmetrically arranged in said clearance space with faces of concave form directed towards the rotor, said concave form being such that during rotation of said rotor, cavities of varying volume are produced between said rotor and said heads as a result of rocking movement of the heads which are arranged to effect limited rolling movement at portions in contact with the inner face of said stator a plurality of sets of air inlet and exhaust ducts and fuel inlet ports in said rotor, each set arranged for communicating sequentially with each of said cavities formed between said heads and said rotor as the rotor turns, in each of said sets the air inlet duct being arranged to communicate with said cavities as they begin to expand before contraction, the fuel inlet port communicating with said cavities at substantially the moment of smallest volume, and the exhaust duct communicating said cavities as they begin to expand after contraction, whereby in use there is produced within said cavities compression of air and fuel for energization by ignition followed by expansion of the ignited fuel as a thermodynamic fluid.

2. A machine according to claim 1 wherein said heads and stator are provided with mutually meshing teeth on their outer and inner surfaces respectively, said stator having inner surfaces formed to a profile conjugated, using evolvent and involute curves, with the profile of the corresponding outer surfaces of said heads, whereby the heads bear against the inside of the stator during said rocking movement and are supported in their rolling action without sliding and at the same time are anchored in such manner that they offer an opposing dynamic reaction to the pressure forces produced by the thermodynamic fluid between said rotor and said heads.

3. A machine according to claim 1, wherein said oscillating heads are fundamentally of segmental form and each have on the outermost face, in conformity with the maximum convexities of said rotor, a cylindrical surface partly formed with a profile conjugated with that of a corresponding guide on the stator and partly formed with teeth meshing with teeth on said guide and, at the innermost concave face, conform substantially to the maximum peripheral curvature of the rotor, whereby when the rotor fits said concave face during rotation there is left only a combustion space of a volume and form suitable for accommodating the compressed fluid to obtain energisation thereof.

4. A thermodynamic machine comprising a stator constituting an outer casing of the machine, said stator being formed with symmetrical contours and mutually parallel plane sides, a generally cylindrical rotor rotatably mounted about the machine axis, said rotor having a non-circular cross-section defined at its periphery by a curvilinear polygon of multiple symmetry with respect to said axis and being formed with inlet and exhaust ducts and ports, an annular clearance space being provided between the inner face of the stator and the outer face of the rotor, at least two oscillating heads which do not rotate with the rotor and are symmetrically arranged in said clearance space with faces of concave form directed towards the rotor, said concave form being such that during rotation of said rotor cavities of varying volume are produced between said rotor and said heads as a result of rocking movement of the heads which are arranged to effect limited rolling movement at portions in contact with the inner face of said stator, and sealing means comprising prisms of fundamentally trapezoidal section housed in radial grooves in said heads which are arranged in a labyrinth way and in a direction parallel to the rotor axis each having an edge fitted closely against the rotor periphery and urged thereagainst by a resilient spring disposed between the back face of the prism and the base of the corresponding groove, and further prisms arranged in a labyrinth way and in laterally disposed inclined grooves in said heads which fit against the lateral sides of said rotor and are similarly urged thereagainst by resilient springs, the arrangement being such that fluid pressure can enter said grooves to provide a pressure-assisted seal for said cavities of varying volume, said inlet and exhaust ducts and ports being so arranged as to admit a thermodynamic fluid to said cavities during rotation of said rotor to produce compression, energization, expansion and exhaust of said fluid.

5. A thermodynamic machine comprising a stator constituting an outer casing of the machine, said stator being formed with symmetrical contours and mutually parallel plane sides, a rotor shaft rotatably mounted about the machine axis, a non-deformable rotor rigidly fixed to said shaft, said rotor being of fundamentally cylindrical form and having a non-circular cross-section defined by a periodic peripheral curve symmetrical with respect to said axis and being formed with inlet and exhaust ducts and ports, an annular clearance space being provided between the inner face of the stator and the uoter face of the rotor, and at least two oscillating heads which rock without sliding and do not rotate with the rotor and are symmetrically arranged in said clearance space with faces of concave form directed toward the rotor, parts of greater curvature of the rotor periphery which fit said concave faces alternating with other parts of smaller curvature to form cavities of maximum volume between said rotor and said heads so that during rotation of said rotor cavities of varying volume are produced between said rotor and said heads as a result of rocking movement of the heads which are arranged to effect limited rolling movement at portions in contact with the inner face of said stator, said inlet and exhaust ducts and ports being so arranged as to admit a thermodynamic fluid to said cavities during rotation of said rotor to produce compression, energization, expansion and exhaust of said fluid.

6. A machine according to claim 5, wherein said peripheral curve of the rotor is developed by circular arcs having two different curvatures, said circular arcs being tangential and abutting against one another in such manner that the difference in curvature provides a measure of the maximum volume of said cavities.

7. A thermodynamic machine comprising a stator formed with symmetrical contours and mutually parallel plane sides, a fundamentally cylindrical rotor rotatably mounted about the machine axis, said rotor having a non-circular cross-section defined at its periphery by a curvilinear polygon of multiple symmetry with respect to said axis and being formed with inlet and exhaust ducts and ports, an annular clearance space being provided between the inner face of the stator and the outer face of the rotor, and at least two oscillating heads which do not rotate with the rotor and are symmetrically arranged in said clearance space with faces of concave form directed towards the rotor said oscillating head having teeth engaging corresponding teeth on the stator so as to rock rather than slide as said rotor turns, said concave form being such that during said rotation cavities of varying volume are produced between said rotor and said heads as a result of rocking movement of the heads which are arranged to effect limited rolling movement at portions in contact with the inner face of said stator, said inlet and exhaust ducts and ports being so arranged as to admit a thermodynamic fluid to said cavities during rotation of said rotor to produce compression, energization, expansion and exhaust of said fluid.

8. A thermodynamic machine according to claim 7, wherein the intake ducts are formed in the two ends of the rotor and shaped of decreasing cross-section toward the perimeter of the rotor so that there is obtained in them a compression of the fluid admitted, for scavenging and for internally cooling the engine, and the exhaust ducts are formed in the two ends of the rotor and with increasing cross-section toward the axis of the rotor so that there is obtained in the latter ducts the subsequent expansion of the exhaust fluid at sufficient pressure to produce a thermodynamic cycle of greater energy efficiency.

9. A machine according to claim 7, wherein the rotor contains in its interior in the parts of larger curvature said inlet ducts and fuel injection ducts, the metered and synchronised fuel entering said cavities approximately when the fluid therein is most compressed and hottest so that the combustion takes place with the maximum appropriate energisation.

10. A machine according to claim 7, wherein conjugated evolvent and involute profiles of the pressure and rolling surfaces of the oscillating heads and guides therefor on the stator are formed by simple curves corresponding to the generatrices of said heads and developed so that radial seals of the oscillating heads are maintained in contact with the peripheral surface of the rotor along generatrices of said heads.

11. A new thermodynamic machine according to claim 10, wherein in engines of higher pressure and speed, there are fitted on lateral parts of the oscillating heads spindles resting by means of suitably arranged bearings on guide surfaces cut in the lateral faces of the rotor, for the purpose of relieving the adjustment and guiding stresses of the radial seals on said rotor periphery.

12. A machine according to claim 10, wherein the cylindrical form of the rotor, while preserving the fundamental axial symmetry thereof presents arcs of different curvature intersect alternately inside and outside the pitch circle, and in that the conjugated profiles of the oscillating heads and said guides are suitably inclined so that the pressure at the instant when the corresponding cavity volume is at its minimum has a resultant which produces a positive moment of rotation in the working direction of the rotor.

13. A thermodynamic engine comprising a hollow cylindrical stator, a plurality of cylindrical roller surfaces on the inner surface of said stator having axes parallel to the axis of the stator and each having gear teeth, a plurality of heads having curved outer surfaces having teeth which mesh with said teeth of the roller surfaces to cause the heads to roll on said bearing surfaces without sliding, a generally cylindrical rotor coaxial with said stator and having a curved polygonal cross-section presenting a plurality of convex outer surface portions of different radii which engage the inner surfaces of said heads to rock them, the inner surfaces of said heads being formed as concave surfaces to define chambers of varying volume with said rotor, combustion air ducts of progressively decreasing cross-section leading from an end face to said outer surface of said rotor, and fuel inlet ducts in said rotor leading to its outer surface, combustion exhaust ducts of progressively increasing cross-section leading from said outer surface to an end face of the rotor, said air, fuel and exhaust ducts being arranged to communicate with said chambers in sequence the fuel being admitted when the chamber is approximately of minimum size, whereby to impart successive turning forces to the rotor as a result of the explosions of the fuel air mixtures in said chambers.

14. An engine according to claim 13 wherein said concave inner surfaces of the heads are provided with marginal slots, and spring urged sealing members in said slots having edges urged into sealing engagement with said outer convex surface portions of the rotor.

References Cited by the Examiner
UNITED STATES PATENTS

| | | | |
|---|---|---|---|
| 1,348,103 | 7/20 | George | 60—39.38 |
| 1,684,824 | 9/28 | Hawthorn | 60—39.38 |
| 1,972,302 | 9/34 | Hutchinson. | |
| 1,983,033 | 12/34 | Hutchinson. | |
| 1,986,202 | 1/35 | Hutchinson. | |
| 2,218,573 | 1/40 | Gahm | 91—109 |
| 2,370,217 | 2/45 | Wright | 60—39.38 |

FOREIGN PATENTS

| | | |
|---|---|---|
| 942,340 | 9/48 | France. |
| 330,657 | 12/20 | Germany. |
| 118,646 | 9/18 | Great Britain. |

SAMUEL LEVINE, *Primary Examiner.*